United States Patent Office.

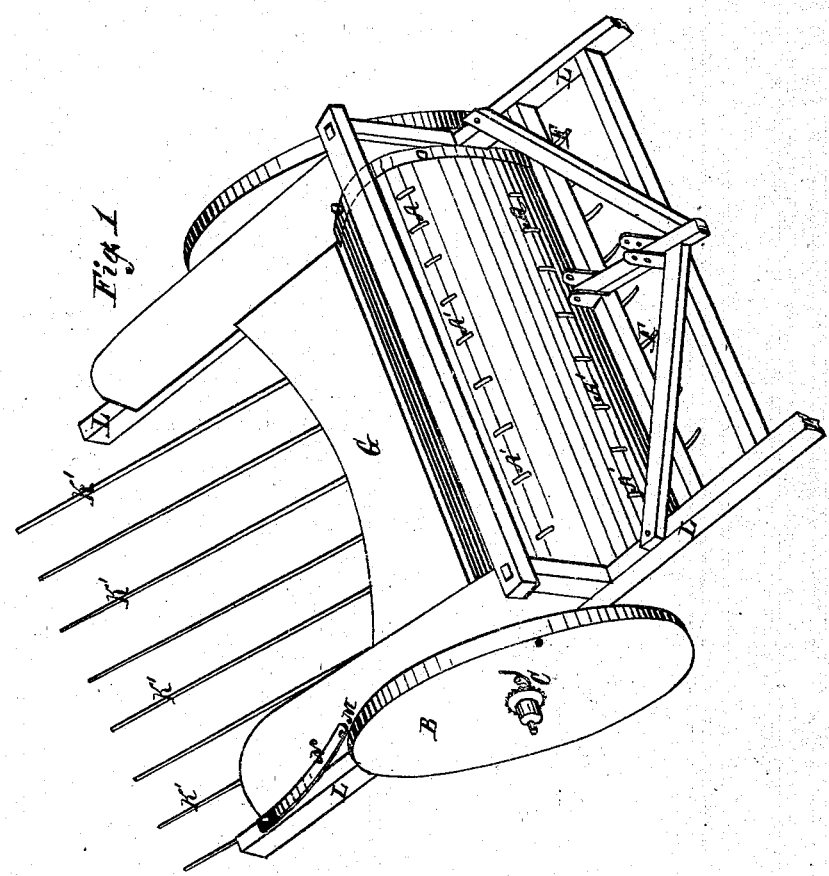

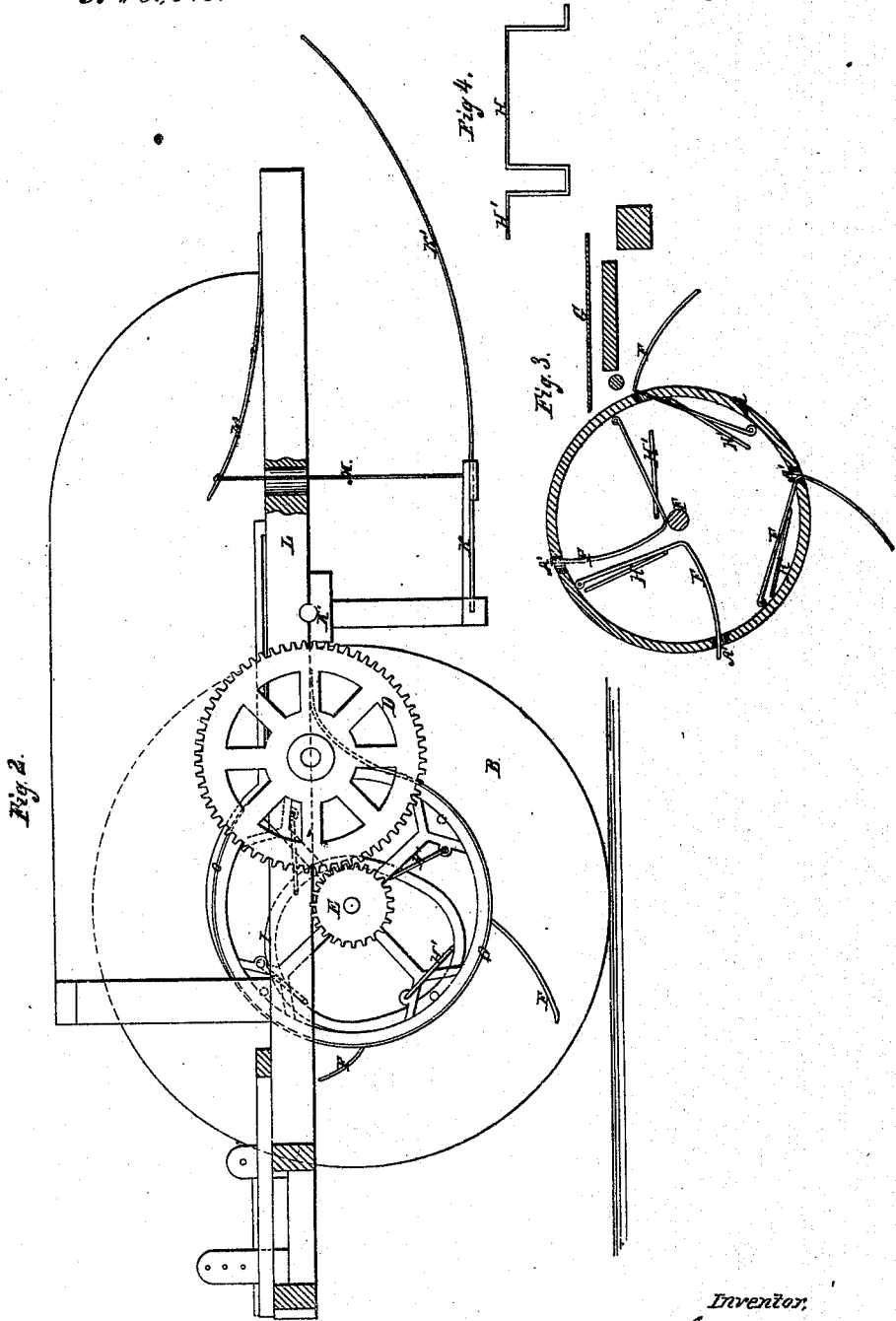

CLARK M. TERRELL, OF OSKALOOSA, IOWA.

Letters Patent No. 69,045, dated September 17, 1867.

---

IMPROVEMENT IN HAY-SHOCKERS.

---

The Schedule referred to in these Letters Patent and making part of the same.

---

TO ALL WHOM IT MAY CONCERN:

Be it known that I, CLARK M. TERRELL, of Oskaloosa, in the county of Mahaska, and State of Iowa, have invented an improved Hay-Gatherer, Hay-Tedder, and Hay-Shocker combined; and I do hereby declare that the following is a full, clear, and exact description of the same, reference being had to the annexed drawings, making part of this specification, in which—

Figure 1 is a perspective view.
Figure 2 is a side elevation with the wheel removed, and
Figure 3 is a vertical longitudinal section.
Figure 4 shows the actuating crank-rod.
The same letters are used in all the figures to indicate the parts which are identical.

The object of this invention is a machine which may be used either for gathering hay and shocking it on the machine, or for a tedder for turning hay upon the ground; and it consists in a novel arrangement of the mechanism for gathering the hay, and in combining with the gathering mechanism a hinged platform, upon which the hay as gathered may be shocked by a person standing upon the machine, and the shock, when made, may be deposited upon the ground in its completed form by the operation of gravity merely.

The following description will enable a person skilled in the art to manufacture and operate this machine.

A is a cylindrical shell hung from the main frame, which, with the forward movement of the wheels B, is caused to revolve in a direction the reverse of that of the wheels. C is a ratchet-wheel and pawl, so connected with the wheels B and their axles that the axles shall turn when the wheel is moving forward, and the wheels shall turn on the axle when the machine is being backed. The spur-wheel D is fastened to the axle, and with its revolution communicates motion to the pinion E on the shaft of the cylinder A.

The cylindrical shell A is punctured with a series of holes, A', arranged in rows longitudinally with the cylinder. The elevating teeth F are hung on the inner side of the shell A upon rods passing from end to end of the cylinder, upon which they oscillate freely. They are bent, as shown in fig. 3, the ends projecting through the holes A', and the part projecting being curved, as there shown. These teeth, when projected, perform the function of raising the cut grass from the ground and carrying it over the cylinder with its revolution, discharging it upon the platform G.

The sets of teeth are successively retracted, to enable them to pass under the platform by means of the crank-rods H, shaped as shown in fig. 4, and hung on the heads of the cylinder. The heads may be closed or open, the crank-rods, in the latter case, passing into the arms. The end H' passes through the head or arm and is bent at right angles, and again bent at right angles at the point, so as to have a horizontal projection, which, with the revolution of the cylinder, is carried against the lower side of the curved cam I, which causes the crank-rods H to turn against the teeth F, retracting them within the holes A'. As they descend they fall by their own gravity as soon as the crank-rod is released from the cam.

When the hay is delivered upon the platform G it is gathered upon a fork by the attendant standing upon the platform, and deposited in the form of a shock upon the platform K. This platform K is suspended upon a shaft attached to the frame L, so as to permit the oscillation of the platform. It consists of a framework, from which project the teeth K', the latter being curved upwards, as shown in fig. 2. This form is essential for keeping the shock in position until discharged in the manner to be described. The platform is sustained in a horizontal position by rods M, which, passing through the frame, are hung from springs N. These springs may be of steel, rubber, coils of wire, or any other suitable material. The tension of the springs must be sufficient to sustain the weight of a shock of hay of the ordinary or designed size, and to allow the platform to descend when the limited weight has been placed upon it. When the shock is completed, if it is not heavy enough to bear down the springs, the operator may, by pressing upon its top with his fork, bear down the springs N, causing the platform to swing upon its bearings until the teeth K' are brought upon the ground, when the shock will be slid off, remaining standing upon the stubble as the teeth pass from under it, the platform immediately returning to its normal position.

Thin metallic bands O are attached to the main frame, surrounding and in close proximity to the ends of the cylindrical shell A. These bands serve to separate the hay that is being elevated from that remaining on the ground, and by their use the hay is prevented from wedging between the cylinder and the frame and clogging the action of the machine.

An elevating apparatus may be attached to the machine for carrying the hay from the cylinder and dropping it upon the platform K, when it is designed to "bunch" the hay instead of shocking it on the machine.

The platforms G and K I propose to connect in such manner with the frame that they may be detached and the cylinder then used alone as a tedder for turning the hay.

What I claim as my invention, and desire to secure by Letters Patent, is—

1. The mode of retracting the teeth F, by means of the crank-shafts H, in combination with the cam I, substantially as set forth.

2. In combination with the cylindrical shell A and teeth F, a receiving-platform for sustaining the operator in forming a shock upon the hinged platform K, substantially as set forth.

3. In combination with a hay-elevating cylinder A and receiving-platform G, the hinged discharging-platform K, arranged to operate substantially as described.

4. The platform K, hinged to the machine and supported by a spring, so arranged as to discharge the shock by the action of gravity merely, substantially as set forth.

5. The combination of the hinged platform K with curved teeth K' and the supporting spring N, substantially as and for the purpose set forth.

6. In combination with the revolving cylindrical shell A, the band O, arranged to operate substantially in the manner and for the purpose set forth.

7. So attaching the platforms G and K that they may be detached and the machine be converted into a tedder, substantially as set forth.

In testimony whereof I have signed my name to this specification in the presence of two subscribing witnesses.

CLARK M. TERRELL.

Witnesses:
R. MASON,
L. A. MURPHY.